United States Patent
Liu

(10) Patent No.: US 7,273,596 B2
(45) Date of Patent: Sep. 25, 2007

(54) METHOD OF PRODUCING GRANULATED ANHYDROUS DICALCIUM PHOSPHATE

(75) Inventor: Sung-Tsuen Liu, Aberdeen, MD (US)

(73) Assignee: J.M. Huber Corporation, Edison, NJ (US)

( * ) Notice: Subject to any disclaimer, the term of this patent is extended or adjusted under 35 U.S.C. 154(b) by 93 days.

(21) Appl. No.: 11/201,048

(22) Filed: Aug. 10, 2005

(65) Prior Publication Data

US 2007/0036704 A1    Feb. 15, 2007

(51) Int. Cl.
*C01B 25/32*    (2006.01)
(52) U.S. Cl. ...................... 423/309; 423/308
(58) Field of Classification Search ............... 423/309, 423/308
See application file for complete search history.

(56) References Cited

U.S. PATENT DOCUMENTS

| | | | |
|---|---|---|---|
| 2,882,127 A | 4/1959 | Baron et al. | |
| 3,294,486 A | 12/1966 | Cremer et al. | |
| 3,409,394 A | 11/1968 | Sprigg et al. | |
| 3,467,495 A * | 9/1969 | Nielsson | 423/173 |
| 4,265,867 A * | 5/1981 | Caswell | 423/309 |
| 4,496,527 A * | 1/1985 | Sherif et al. | 423/309 |
| 4,675,188 A * | 6/1987 | Chu | 424/602 |
| 4,707,361 A * | 11/1987 | Gustafson et al. | 424/602 |
| 4,721,615 A * | 1/1988 | Griffith et al. | 424/57 |
| 4,755,367 A | 7/1988 | Brachtel et al. | |
| 5,108,728 A | 4/1992 | Rau et al. | |
| 5,338,524 A * | 8/1994 | Maurer et al. | 423/309 |
| 5,683,496 A * | 11/1997 | Ison et al. | 106/35 |
| 5,693,303 A * | 12/1997 | Weideman et al. | 423/308 |
| 5,855,869 A * | 1/1999 | Domke et al. | 424/49 |

* cited by examiner

*Primary Examiner*—Wayne A. Langel
(74) *Attorney, Agent, or Firm*—Carlos Nieves; William Parks

(57) ABSTRACT

A new and useful method of simultaneously producing and granulating anhydrous dicalcium phosphate is provided. Such a method entails the reaction of concentrated phosphoric acid with a powdered material of lime and/or calcium carbonate in substantially equal stoichiometric amounts, with subsequent, mixing, drying, milling, and sieving to provide the correct target particle size range for the resultant granulated materials. Such specifically produced granulated anhydrous dicalcium phosphate materials exhibit very high available calcium levels, excellent flow characteristics, and very high capability for compression into tablets. Products including such particularly produced granulated anhydrous dicalcium phosphate materials are also encompassed within this invention.

2 Claims, No Drawings

METHOD OF PRODUCING GRANULATED ANHYDROUS DICALCIUM PHOSPHATE

The present invention relates generally to a new and useful method of simultaneously producing and granulating anhydrous dicalcium phosphate. Such a method entails the reaction of concentrated phosphoric acid with a powdered material of lime and/or calcium carbonate in substantially equal stoichiometric amounts, with subsequent, mixing, drying, milling, and sieving to provide the correct target particle size range for the resultant granulated materials. Such specifically produced granulated anhydrous dicalcium phosphate materials exhibit very high available calcium levels, excellent flow characteristics, and very high capability for compression into tablets. Products including such particularly produced granulated anhydrous dicalcium phosphate materials are also encompassed within this invention.

BACKGROUND OF THE INVENTION

Anhydrous (or dehydrated) dicalcium phosphate has been commonly used as an excipient for tableting, a source of calcium and phosphorus in nutritional supplements, a polishing agent within dentifrices, a carrier for human and animal nutrients, as well as a dough conditioner for yeast-containing foodstuffs. For tableting and nutrition applications, such anhydrous dicalcium phosphate materials should be able to compress directly and easily and simultaneous exhibit good flow character. Powdered materials of such materials tend to exhibit cementation and thus cannot easily flow (without excessive amounts of required energy and thus increased processing costs), nor can produce a stable compressed tablet.

It has been a combined aim for such materials to deliver the highest level of available calcium within a form that permits proper transfer, tablet production, and ultimate ingestion by a target patient. As such, the provision of granulated dicalcium phosphate has been a requirement within the subject industries. Without granulation, the subject dicalcium phosphate materials would exhibit, as a powder, poor flowability characteristics, cementation during storage and high levels of dusting when transferred, at least, while incorporating such materials into proper orally ingested tablets and/or capsules. Thus, there is a need to provide cost-effective granulation of such materials to meet the requirements noted above.

Granulation has typically included the utilization of binder systems to facilitate the massing of dicalcium phosphate powders into larger particle size granules. Such a method, although well known, and extensively followed, exhibits certain drawbacks that leave room for improvement. For instance, such binders, including, without limitation, starch, gelatin, hydroxypropyl methylcellulose, polyvinylpyrrolidone, and the like, are relatively expensive and/or require relatively high levels of use to effectively provide the needed degree of granulation to occur. In fact, a level of 5.0 parts per hundred parts of dicalcium phosphate is generally the low level of binder additive present within final granulated dicalcium phosphate formulations. This produces a material that exhibits at most 95% bioavailable dicalcium phosphate for utilization by the target patient/user within a typical tablet/capsule, or requires the production of relatively large size tablets and/or capsules to increase the amount of bioavailable dicalcium phosphate present therein. An increase in the amount of bioavailable dicalcium phosphate would thus be a desired result in order to reduce binder costs, reduce the amount of additives needed to permit granulation, and reduce pill sizes without restricting or reducing the amount of calcium available to the patient/user during ingestion. All of these benefits would necessarily result without any concomitant loss in flowability of the granulated dicalcium phosphate in comparison with the typical binder-granulated types as well. To date, although such granulated dicalcium phosphate is well known and used widely, particularly within the nutrition and pharmaceutical industries, as noted above, such a desirable improvement has not been achieved.

In the past, the typical manner of producing anhydrous dicalcium phosphate involved the initial precipitation of either anhydrous (dehydrated) or dihydrated dicalcium phosphate by introducing lime or calcium carbonate into a vessel of diluted phosphoric acid, followed by the separation via filtration of the resultant precipitated solid from the mixture, drying the resultant particles, and then subsequent granulation of the collected fine particles. Subsequently, if the dihydrate was formed, thorough drying was necessary to drive of the water to provide the ultimate dehydrated form. Such an involved method was not only cumbersome to perform, but required multiple steps that resulted in increased manufacturing costs, and involved large amounts of potential dangerous phosphoric acid. A less involved, and thus, presumably, less costly alternative is thus highly desired within the industry. To date, no method of directly producing granulated dehydrated dicalcium phosphate that involves a less labor intensive process than that described above has been provided within the pertinent industry.

BRIEF DESCRIPTION OF THE INVENTION

It has now been determined that the highly desired, but previously unavailable, improvements in granulated dicalcium phosphate materials as noted above may be obtained through a method of reacting concentrated phosphoric acid with a powdered material of lime and/or calcium carbonate in substantially equal stoichiometric amounts, allowing the reaction thereof to form dicalcium phosphate granulates, and collecting, drying, and sieving the granulates. Such a method, described in greater detail below, actually provides the advantage of producing not only the desired dicalcium phosphate materials, but also directly and simultaneously generating the desired granules of such materials in a single step. Such a method thus accords the producer a time-, cost-, and resource-efficient manner of making the desired granulated dicalcium phosphate end-product without having to first provide a powder and thus avoiding the any subsequent granulation steps thereafter. As a result, no binders are needed to provide such granulated materials and very low amounts of introduced water (if not omitting introduced water completely) are required to effectuate the target production method. The overall finished product then not only exists in granulated form, but such materials exhibit excellent flow properties and high amounts of available calcium therein. Such free flow properties also result in the ability to easily dispense the granulates uniformly into capsules with little to no dusting and/or lack of control (and thus possible waste of material) during filling of individual capsules and uniformly feed into an automatic tablet press. Furthermore, another advantage of this method, and thus the resultant dicalcium phosphate granulates made therefrom, is the compressibility of the granulates into tablets for ingestion by a patient/user as well, particularly due to such materials exhibiting brittle fraction during compaction. Additionally, the granulated materials may be milled upon production and collection into powders if such a form of dicalcium phosphate is preferred.

Accordingly, this inventive granulation method entails the steps of a) providing a solid material selected from the group consisting of lime and calcium carbonate and any mixtures thereof; b) introducing a substantially equal stoichiometric amount of concentrated phosphoric acid to the solid material of step "a"; c) optionally introducing an amount of water not to exceed 30% by weight of the amount of phosphoric acid of step "b"; d) mixing the resultant solution of step "c" or "d"; e) collecting the resultant particles from the mixing of step "d", and f) drying said resultant particles of step "e".

Such a novel method permits, as noted above, the production of a granulated dicalcium phosphate that is formed simultaneously during dicalcium phosphate generation, is substantially free of typical granulation binders, exhibits excellent flow characteristics to facilitate transport and handling, and can be compressed into tablets.

DETAILED DESCRIPTION OF THE INVENTION

For the purposes of this description, the term "calcium carbonate powder" and any variations thereof, is intended to encompass any powdered material of calcium carbonate, including ground calcium carbonate and precipitated calcium carbonate. The term "introduced water" is intended to mean water that is actually adding physically to the overall reaction rather than water that may be present within the phosphoric acid solution.

The term "concentrated phosphoric acid" is intended to encompass a solution of phosphoric acid in liquid form with at most 15% by weight of water present. Thus, such a concentrated acid will exhibit a very high molarity and/or concentration (at least 85% concentration). Such an acid should be introduced within the solid lime or calcium carbonate sample in an amount that is considered stoichiometric, in essence in a 1:1 stoichiometric ratio, in order to generate the desired dehydrated dicalcium phosphate thereby, as well as to utilize as much of the reactants as possible, in order to reduce the need for disposal of unreacted reactants or to prevent the need for collection thereof such reactants for recycling in a further manufacturing batch. The term "substantially equal stoichiometric amounts" is thus intended to convey that although it is preferable to react even stoichiometric amounts of such starting materials, there is some leeway for human error, as well as for the option of adding an excess of one of the reactants if desired. The overall method will not be impacted in terms of proper production of the desired granulated product if uneven stoichiometric amounts are used, but in order to generate a low amount of waste, and high yields of the target granulates, the closer to similar stoichiometric levels the better.

The inventive method is relatively simple to follow, which is yet another advantage. Basically, a starting calcium carbonate powder is obtained initially. To this powder is added the concentrated phosphoric acid in the stoichiometric amount noted above. Such introduction of phosphoric acid may be performed through any means, including, without limitation, drop-wise addition while stirring, if in smaller batch sizes, or in repetitive streams of the liquid solution at set intervals and in set volumes for each repeated introduction. The rate of addition should be performed in a range of anywhere between 0.1 to 100 ml/min per 350 g of lime or calcium carbonate (or, between 0.000285 to 0.285 ml/min per gram of calcium carbonate), preferably slower, of from 1 to 25 ml/min per 350 g of lime or calcium carbonate. This repetitive introduction step is potentially preferred as it permits reaction of the concentrated phosphoric acid in discrete areas within the provided lime or calcium carbonate powder to best ensure, while stirring, that substantially uniform reaction and resultant granulation occurs. Spraying of the phosphoric acid solution on the powder while or with subsequent stirring is also possible. The granulation may be performed in any apparatus known in the industry such as mixers having low shear or high shear, fluid bed technology, and the like.

The amount of concentrated phosphoric acid to be added to the provided lime or calcium carbonate powder must conform to the stoichiometric ranges as noted previously. Specific volumes to be added are not critical as the important feature is to properly introduce the phosphoric acid at intervals or through a steady, slow stream while the powder is properly stirred, and in a stoichiometric amount.

Subsequent to reaction of the two components, the wet mixture is then collected and dried. This drying step may be performed within any well known apparatus, including, without limitation, a rotary dryer, an oven, a fluid bed drier, and the like. The purpose for drying is to remove the excess water through evaporation to leave a granulated solid dehydrated dicalcium phosphate in particulate form. Such a dried particulate may then be milled, again with any standard well known apparatus, including, without limitation, a hammer mill, a ball mill, an air mill, a bead mill and the like. The milled particulate can then either be separated through a sieve to provide narrow ranges of particle size materials, or coupled with any fines separated through sieving. Such sieving thus may be utilized as either a particle size sequestration means, or to ensure the granulates are reduced to their smallest particle sizes, or even to permit generation of dicalcium phosphate powders for use as potentially desired.

The traditional processing methods, and thus the closest prior art to such a novel method, are taught within U.S. Pat. No. 3,095,269 (preparation by precipitating the product from a slurry of lime and dilute phosphoric acid which has been heated above 80° C.), U.S. Pat. No. 3,068,067 (preparation by precipitation from a mother liquor containing a combination of monoammonium phosphate with ammonium and calcium chloride), and U.S. Pat. No. 3,353,908 (preparation from a monoalkali metal phosphate solution in combination with gypsum in a mill). Such specific dehydrated dicalcium phosphate materials are, however, unsuitable in dry direct compression as the particles are too fine and will not flow properly into the compression dies. Furthermore, such compounds cannot meet U.S. Pharmacopeia (U.S.P.) standards without further treatment as they contain ammonium, chloride or sulfate ions, nor may these anhydrous compositions be dry granulated to make a dry direct compression tableting composition. The inventive one-step method and dehydrated dicalcium phosphate products made therefrom are thus significant improvements over these typical procedures and materials.

Once produced, the desired inventive dehydrated (anhydrous) dicalcium phosphate particles can then be introduced into desired end use formulations and/or forms. For instance, the resultant granulated dicalcium phosphate materials may be used as produced and introduced into gelatin capsules to provide a calcium supplement for a patient/user. Such a supplement may be utilized as a delivery system for calcium (for various reasons and/or purposes, such as a manner of treating osteoporosis, as one non-limiting example), among other various uses, both as a direct supply of calcium, phosphate, or both, or as a carrier for other materials. Tablets or lozenges may also be produced from such materials through compression techniques as well. Such tablets may utilize solely the inventive granulated dicalcium phosphate materials, or may include certain binders or other additives that act as compression aids to improve the friability of such a tablet formulation. Such binders or compression aids may include, without limitation, gum acacia, maltodextrin, alginic acid, gelatin, guar gum, povidone, pregelatinized starch, glucose, ethylcellulose, carboxymethyl cellulose, microcrystalline cellulose, and hydroxypropyl methylcellulose.

Other additives may be present within either a tablet or capsule form including the inventive dicalcium phosphate materials depending on the nature of the end use selected. Thus, pharmaceutical actives may be present, including any number of analgesics, acid scavengers, cold remedies and the like. Additional dietary supplement ingredients may be present such as essential minerals (potassium, magnesium, selenium, iron, and the like), vitamins, folic acid, niacin and the like. Excipients may be added to tablets to aid in quick tablet disintegration when placed in the buccal cavity as well. Such excipients include, without limitation, crospovidone, MCC, sodium starch glycolate and calcium silicate, such as RXCIPIENT® FM1000 from J.M. Huber Corporation. Other additives possible within such formulations include coatings (such as cellulose ethers, gums, and the like) over the tablet or lozenge surface, sweeteners, diluents, flavoring agents, colorants, preservatives, other antacid compounds (such as aluminum hydroxide, magnesium hydroxide, magnesium carbonate, and the like), and other typical additives for such orally administered dicalcium phosphate tablet compositions.

PREFERRED EMBODIMENTS OF THE INVENTION

The following non-limiting examples are provided as guidelines to follow in the manufacture of the inventive dicalcium phosphate products.

EXAMPLES 1-3

To make granules of dicalcium phosphate, 50 g of either PCC or GCC calcium carbonate ($CaCO_3$) was placed in a 500-ml beaker and then a quantity of 85% phosphoric acid was added dropwise while mixing the mass with a spatula. After all the acid was added, the resultant dicalcium phosphate particles were collected and dried overnight at 100° C. For Example 3, after the acid addition was completed, 4 ml of water was added to the mass with mixing and then the granules were dried as before. The dried granules were ground gently using a mortar and pestle and passed through a 20 mesh (850 μm) sieve. Variable for Examples 1-3 are summarized below in Table 1.

TABLE 1

| Example | $CaCO_3$ Source | $CaCO_3$ g | 85% $H_3PO_4$ g |
|---|---|---|---|
| 1 | VICALITY ® [1] | 50 | 57.6 |
| 2 | HUBERCAL ® 850[2] | 50 | 57.6 |
| 3 | HUBERCAL ® 850 | 50 | 59.3 |

[1] VICALITY is a precipitated calcium carbonate (PCC) available from Specialty Minerals, Inc., Bethlehem, Pennsylvania
[2] HUBERCAL products are ground calcium carbonate available from J. M. Huber Corporation, Quincy, Illinois.

EXAMPLES 4-6

Granules were made as in Example 2 except that the 85% phosphoric acid was diluted with a specified quantity of water before addition to the ground calcium carbonate. To make granules of anhydrous dicalcium phosphate, 50 g of HUBERCAL® 250 GCC was placed in a 500-ml beaker and then a quantity of diluted phosphoric acid was added dropwise while mixing the mass with a spatula. Variables used to make Examples 4-6 summarized in Table 2.

TABLE 2

| Example | 85% $H_3PO_4$ g | Water Addition, g | Diluted % $H_3PO_4$ |
|---|---|---|---|
| 4 | 57.6 | 7 | 75.8 |
| 5 | 57.6 | 14 | 68.4 |
| 6 | 57.6 | 19 | 63.9 |

Example 4 conditions enabled granules to be formed, while examples 5 and 6 formed a paste rather than distinct granules. Thus, when the amount of proportion of concentrated phosphoric acid falls to below about 70% (or the water exceeds about 30% by weight of the phosphoric acid), the overall method fails to generate the desired granulated materials. Thus, Examples 5 and 6 are comparative in this instance.

EXAMPLES 7-8

Granules of dicalcium phosphate anhydrous were formed by introducing 350 g ground calcium carbonate, HUBERCAL® 250 into Hobart mixing tank and thereafter adding phosphoric acid solution dropwise with mixing on medium speed during a period of about 20 minutes. The phosphoric acid solution was prepared by mixing 403.5 g of 85% phosphoric acid with 40 g of water for Example 7 and with 60 g water for Example 8. The formed wet granule was then oven dried at 100° C. overnight. The dried granules were passed through a 20 mesh (850 μm) sieve. The granules which did not pass through the 20 mesh sieve were gently milled with a mortar and pestle, sieved through the 20 mesh sieve and combined with the granules which previously passed through the sieve.

The granules prepared in the examples above were tested for flowability, particle size distribution and X-ray diffraction (XRD) for composition according to the methods described below. The evaluation results are summarized in Table 3.

The intrinsic flowability, which is the property of a powder to flow evenly under the action of gravity and other forces, was determined using a FLODEX tester available from Hanson Research, Chatsworth, Calif. The FLODEX tester is comprised of a funnel with stopper to hold the test powder, under which is a straight-walled open cylinder and finally one of a series of plates with increasing orifice sizes. The FLODEX tester was assembled with the plate having the smallest orifice size and 50 g of the sample was placed in the stoppered funnel. After 30 seconds the stopper was removed and if the sample flowed through the orifice, the size of the orifice diameter, in mm, was recorded as the FLODEX index. If the sample did not flow through the orifice, the sample was placed back in the funnel and the experiment was repeated with plates of increasing orifice size until the sample flowed through an orifice. The diameter of the smallest orifice needed for flow was recorded as the FLODEX index. This test simulates how materials will flow, i.e. to feed a tableting machine.

The particle size distribution was evaluated by placing the 100 g of granules on a stack of U.S. sieves selected from 20 mesh (850 μm), 50 mesh (180 μm), 100 mesh (150 μm), 120 mesh (125 μm), 140 mesh (105 μm), and 200 mesh (75 μm) with the sieves having the largest openings at the top, i.e. in the order listed with the 20 mesh sieve on top and 200 mesh sieve at the bottom. The sieves were placed on a Boerner Portable Sieve Shaker, Model RX-24, available from W.S. Tyler, Inc., Mentor, Ohio, and shaken for 5 minutes after which the screens were separated and the granules on each utilized sieve were weighed.

Composition crystalline phase was determined by powder X-Ray Diffraction (XRD) by comparing diffractograms of the example materials to the standard JCPDS diffractograms for dicalcium phosphate, synthetic, ($CaHPO_4$, JCPDS No. 70-1425) denoted in the table as "DCP".

TABLE 3

|  | Ex 1 | Ex 2 | Ex 3 | Ex 7 | Ex 8 |
|---|---|---|---|---|---|
| Flodex Index, mm | 7 | 8 | 8 | 6 | 6 |
| % particles > 850 μm | 0 | 0 | 1.54 | 0.2 | 0.2 |
| % particles 850-180 μm | — | — | 59.11 | 27.8 | 22.6 |
| % particles 180-150 μm | — | — | 30.4 | 28.7 | 38.6 |
| % particles 150-105 μm | — | — | — | 13.6 | 12.9 |
| % particles 105-75 μm | — | — | — | 11.5 | 12.3 |
| % particles < 75 μm | — | — | — | 18.3 | 15.4 |
| % particles 150-125 μm | — | — | 3.30 | — | — |
| % particles < 125 μm | — | — | 6.68 | — | — |
| XRD Identification | DCP | DCP | DCP | DCP | DCP |

EXAMPLE 9

Directly compressible excipient granules made in Example 8 were compressed into tablets and several properties of the formed tablets were evaluated. Tablets were prepared by weighing all formulation ingredients (97.5% DCP and 2.0% croscarmellose sodium) together, except the lubricant magnesium stearate, on a weighing pan. The combined ingredients were passed through a 20 mesh (850 μm) sieve to remove any lumps and then the resulting mixture was transferred to a PK-V blender (twin shell dry blender model 014-215-0053, available from Patterson Kelly, East Stroudsburg, Pa.) and mixed for 5 minutes. The magnesium stearate lubricant (0.5%) was then geometrically diluted with the mixture and then added back to the PK blender and all ingredients mixed together for an additional 2 minutes.

Tablets were produced from the resulting formulation on an 8-station Piccola rotary tablet press available from Riva S.A., Argentina, fitted with 10 mm standard concave die punches compacting at 10 kN, 20 kN and 30 kN compression forces. Tablet weight was maintained at about 800 mg by adjusting the tablet press. Tablet ejection force was measured by the tablet press instrumentation software. Tablet properties were measured according to the method described below and the results are summarized in Table 4.

All tablets were prepared 24 hours before testing weight, hardness, thickness, disintegration time and friability.

Tablet hardness, expressed in kP, was measured on 5 tablets utilizing an Erweka TBH30 instrument (Milford, Conn.) and the result reported was an average of 5 measurements.

Tablet disintegration time (DT) was determined according to the USP test for uncoated tablets by placing 3 tablets (each tablet in a separate tube) in an Erweka ZT72 disintegrator (Milford, Conn.). The tablets were repeatedly immersed in 37° C. deionized water at a rate of 30 strokes per minute until the tablets disintegrated, as detected and recorded by the instrument. The reported result was an average of the measurements.

Tablet friability was determined by placing 10 tablets in a Distek, Inc. Friabilator DF-3 (North Brunswick, N.J.) set for 100 revolutions. The % friability is calculated from the amount of tablet weight lost (friable) by weighing the tablets before and after rotation.

TABLE 4

|  | Compression Force, kN | | |
|---|---|---|---|
|  | 10 | 20 | 30 |
| Tablet weight, mg | 796 | 792 | 796 |
| Tablet thickness, mm | 6.29 | 5.84 | 5.62 |
| Ejection Force, N | 330 | 577 | 811 |
| Tablet Hardness, Kp | 4.26 | 11.05 | 19.36 |
| % Friability | 3.6 | 1 | 0.39 |
| DT, seconds | 28 | 32 | 27 |

When this granulation was compressed at 20-30 kN compaction pressure, the tablets demonstrated acceptable physical characteristics performance, such as high tablet hardness and low tablet friability. Tablet hardness, friability and ejection forces were acceptable for tablets compressed on 10 mm tooling. The fast disintegration test results seen in the test formulation indicates that this excipient does not negatively impact this important tableting criterion. It is demonstrated by the very reproducible tablet weights that the excellent flow properties of this inventive product provides uniform die fill during tableting and is suitable for use as a directly compressible excipient.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A method of producing anhydrous dicalcium phosphate comprising the steps of
    a) providing a powdered material selected from the group consisting of lime and calcium carbonate and any mixtures thereof;
    b) introducing a substantially equal stoichiometric amount of concentrated phosphoric acid to the material of step "a";
    c) optionally introducing an amount of water not to exceed 30% of the amount of phosphoric acid of step "b";
    d) mixing the resultant solution of step "b" or "c";
    e) collecting the resultant particles from the mixing of step "d", and
    f) drying said resultant particles of step "e".

2. The method of claim 1 wherein the introduction of the concentrated phosphoric acid in step "b" is accomplished through dropwise addition at a rate of from 0.1 to 100 ml/min per 350 grams of lime and/or calcium carbonate powder material.

* * * * *